United States Patent

Inoue et al.

[11] Patent Number: 5,989,703
[45] Date of Patent: Nov. 23, 1999

[54] IRON OXIDE MAGNETIC POWDER AND MAGNETIC RECORDING MEDIUM USING THE SAME

[75] Inventors: Makoto Inoue; Akiko Watanabe; Taro Sasaki, all of Miyagi, Japan

[73] Assignee: Sony Corporation, Tokyo, Japan

[21] Appl. No.: 09/126,865

[22] Filed: Jul. 31, 1998

Related U.S. Application Data

[62] Division of application No. 08/887,704, Jul. 3, 1997, abandoned.

[30]     Foreign Application Priority Data

Jul. 4, 1996   [JP]   Japan ................................... 8-175198

[51] Int. Cl.$^6$ .................................................. G11B 5/706
[52] U.S. Cl. .................................. 428/329; 428/694 BA; 428/900
[58] Field of Search ........................... 428/329, 694 BA, 428/900

[56] References Cited

U.S. PATENT DOCUMENTS

| | | | |
|---|---|---|---|
| 5,178,935 | 1/1993 | Saito et al. | 428/212 |
| 5,202,043 | 4/1993 | Wiese et al. | 252/62.56 |
| 5,609,789 | 3/1997 | Asano et al. | 252/62.56 |

FOREIGN PATENT DOCUMENTS 0 606 904 A1   7/1994   European Pat. Off. .

*Primary Examiner*—Stevan A. Resan
*Attorney, Agent, or Firm*—Hill & Simpson

[57] ABSTRACT

Iron oxide magnetic powder having small crystallite size and a small specific surface area, a manufacturing method therefor and a magnetic recording medium having excellent surface characteristics and satisfactory electromagnetic conversion characteristics are provided. The iron oxide magnetic powder contains crystallite having size of 30 nm or less when measured by an X-ray diffraction method and has a specific surface area of 30 $m^2/g$ or less when measured by a BET method, and a magnetic recording medium using the iron oxide magnetic powder as the magnetic member thereof are provided.

3 Claims, 1 Drawing Sheet

IRON OXIDE MAGNETIC POWDER AND MAGNETIC RECORDING MEDIUM USING THE SAME

This application is a division of Ser. No. 08/887,704 filed Jul. 3, 1997 abandoned.

BACKGROUND OF THE INVENTION

1. Field of the Invention

The present invention relates to a coating type magnetic recording medium for use in an audio tape, a video tape or the like, iron oxide magnetic powder contained in a magnetic layer of the magnetic recording medium and a manufacturing method therefor.

2. Description of Related Art

Hitherto, γ-iron oxide coated with Co and thus having intense coercive force, that is, maghemite ($\gamma$-$Fe_2O_3$) has been employed to manufacture video tapes for use in home video tape recorders.

On the other hand, an intermediate of γ-iron oxide coated with Co, that is, so-called magnetite ($Fe_3O_4$), has been used widely because of a high magnetization rate and a high absorbance. Since magnetite has a large number of $Fe^{2+}$ ions per unit volume thereof, it has a high magnetization rate. Therefore, it raises the magnetic flux density as a magnetic recording medium, thus causing the electromagnetic conversion characteristics to be improved.

However, the electromagnetic conversion characteristics depend upon the size of magnetic powder as well as the magnetic characteristics. Since the width of transition region for flux reversal is therefore reduced in proportion to the size of the magnetic powder, the high region (short wavelength) characteristics, which determine the resolution of an image, are affected considerably. As for the reproduction output, information can effectively be reproduced only in a case where the major axis of magnetic powder is not longer than ½ of the recording wavelength. The ratio (S/N) of an output signal with respect to noise which generates at the time of reproduction is considered to be in proportion to the square root of the inverse number of the volume of the magnetic powder.

To obtain the above-mentioned characteristics, the size of magnetic powder is required to be reduced. If the size of magnetic powder is reduced, the specific surface area (the surface area per unit weight) is enlarged and thus the cohesiveness among particles is intensified. Moreover, the number of particles per unit volume is enlarged. Therefore, the viscosity of the coating is raised, thus resulting in that magnetic powder cannot easily and uniformly be dispersed. That is, if magnetic powder is not uniformly dispersed, satisfactory surface and magnetic characteristics of the magnetic layer cannot be obtained. Thus, there arises a problem in that expected characteristics cannot be obtained.

However, the factor actually relating to magnetization of signals is the size of each crystal particle forming a single magnetic domain. Therefore, reduction in the size of crystallite contained in skeleton particles relating to dispersion while retaining the size of the skeleton particles enables the above-mentioned contrary characteristics to be realized.

SUMMARY OF THE INVENTION

In view of the foregoing, an object of the present invention is to provide iron oxide magnetic powder containing crystallite having small size and skeleton particles having large size, that is, small specific surface area, and a manufacturing method therefor.

Another object of the present invention is to provide a magnetic recording medium having excellent surface characteristics and satisfactory electromagnetic conversion characteristics because the iron oxide magnetic powder according to the present invention is employed to form the magnetic layer thereof.

As a result of energetically development and research performed by the inventors of the present invention, a fact was found that dehydration of γ-oxy iron hydroxide ($\gamma$-FeOOH) at low temperatures enables maghemite ($\gamma$-$Fe_2O_3$) to be obtained which has small crystallite size and magnetism. The γ-oxy iron hydroxide can easily be obtained from water solution of iron chloride and has a structure of an aggregate of small crystal having a needle shape.

Since the maghemite has a spinel crystal form which is the same as that of magnetite, it can be reduced at relatively low temperatures and thus magnetite powder, which is an aggregate of small crystal having a needle shape, can be obtained.

The present invention was established on the basis of the above-mentioned facts.

According to one aspect of the present invention, there is provided iron oxide magnetic powder including crystallite having size of 30 nm or less when measured by an X-ray diffraction method and a specific surface area of 30 $m^2$/g or less when measured by a BET method.

According to another aspect of the present invention, there is provided a magnetic recording medium including a magnetic layer containing iron oxide magnetic powder including crystallite having size of 30 nm or less when measured by an X-ray diffraction method and a specific surface area of 30 $m^2$/g or less when measured by a BET method and a binder, wherein the magnetic layer is formed on a non-magnetic support member.

According to another aspect of the present invention, there is provided a method of manufacturing iron oxide magnetic powder including the step of: dehydrating γ-oxy iron hydroxide ($\gamma$-FeOOH) at 250° C. to 350° C. to obtain maghemite ($\gamma$-$Fe_2O_3$).

The method of manufacturing iron oxide magnetic powder may be arranged such that the maghemite ($\gamma$-$Fe_2O_3$) is subjected to heat treatment at 260° C. to 350° C. under a reduction atmosphere to obtain magnetite ($Fe_3O_4$).

The method of manufacturing iron oxide magnetic powder may be arranged such that the magnetite ($Fe_3O_4$) is again oxidized to obtain maghemite ($\gamma$-$Fe_2O_3$).

Since the method of manufacturing the iron oxide magnetic powder according to the present invention has the structure arranged such that γ-oxy iron hydroxide ($\gamma$-FeOOH) is, as described above, dehydrated and reduced at relatively low temperatures, iron oxide magnetic powder having small crystallite, large skeleton particles and a small specific surface area can be obtained.

Therefore, the iron oxide magnetic powder is not coagulated and thus it is uniformly dispersed during the kneading process for kneading the iron oxide magnetic powder into a medium such as a binder. Moreover, since the viscosity of the magnetic coating can be lowered, excellent coating characteristics preferred in the coating process for coating the non-magnetic support member with the magnetic coating can be obtained.

The magnetic recording medium using the iron oxide magnetic powder as the magnetic member thereof has excellent surface characteristics because the iron oxide magnetic powder can easily be dispersed in the magnetic coating, the viscosity of the magnetic coating can be lowered and thus excellent coating characteristics can be obtained. Moreover, the magnetic recording medium containing the iron oxide magnetic powder having the small crystallite size enables excellent electromagnetic conversion characteristics in the high regions to be realized.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
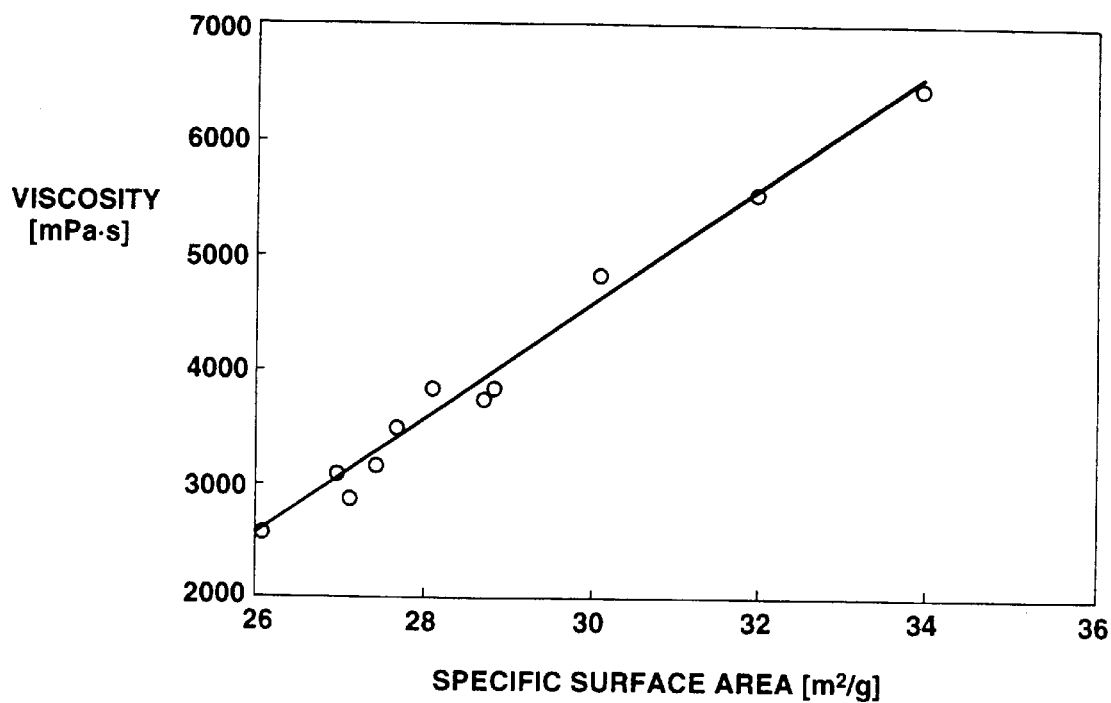
FIG. 1 is a graph showing the relationship between specific surface areas of iron oxide magnetic powder and viscosity of magnetic coating.

Iron oxide magnetic powder according to the present invention, a magnetic recording medium using the same and a method of manufacturing the iron oxide magnetic powder will now be described.

The iron oxide magnetic powder according to the present invention contains crystallite having size of 30 nm or less when measured by an X-ray diffraction method and a specific surface area of 30 m$^2$/g or less when measured by a BET method.

The magnetic recording medium according to the present invention has a structure formed such that a magnetic layer containing the iron oxide magnetic powder and a binder is formed on a non-magnetic support member. Since the magnetic recording medium according to the present invention has the structure arranged such that the iron oxide magnetic powder, the skeleton of which has large size and which has a small specific surface area, is used as the magnetic member thereof, the iron oxide magnetic powder does not coagulate but the same can uniformly be dispersed during a kneading process for magnetic coating in which the iron oxide magnetic powder is kneaded into a medium, such as the binder. Also excellent coating characteristics can be obtained in a process for coating the surface of the non-magnetic support member with the magnetic coating because the magnetic coating has a low viscosity. As a result, a magnetic layer having excellent surface characteristics can be formed. Since the iron oxide magnetic powder has a small crystallite size though it has large skeleton particles, the recording medium having the iron oxide magnetic powder according to the present invention as the magnetic member thereof has excellent electromagnetic conversion characteristics in the high region (a short wavelength region).

The iron oxide magnetic powder according to the present invention is exemplified by maghemite ($\gamma$-Fe$_2$O$_3$) coated with Co and magnetite (Fe$_3$O$_4$) coated with Co.

The maghemite ($\gamma$-Fe$_2$O$_3$) can be obtained by dehydrating $\gamma$-oxy iron hydroxide ($\gamma$-FeOOH) at 250° C. to 350° C.

The magnetite (Fe$_3$O$_4$) can be obtained by subjecting the maghemite ($\gamma$-Fe$_2$O$_3$) to heat treatment at 260° C. to 350° C. under a reduction atmosphere.

When magnetite (Fe$_3$O$_4$) is again oxidized, the maghemite ($\gamma$-Fe$_2$O$_3$) can be obtained.

The maghemite ($\gamma$-Fe$_2$O$_3$) may be obtained by dehydrating $\gamma$-oxy iron hydroxide ($\gamma$-FeOOH) at 250° C. to 350° C. or by again oxidizing magnetite (Fe$_3$O$_4$) obtained by reducing maghemite ($\gamma$-Fe$_2$O$_3$).

Although the size of the crystallite is somewhat enlarged because of enlargement of the heat hysteresis if re-oxidation is performed, satisfactory effects can be obtained to improve the light transmissivity and electric resistance because the quantity of Fe$^{2+}$ can be adjusted by controlling the degree of oxidation.

The conventional method of obtaining iron oxide magnetic powder from usual ($\alpha$-FeOOH must convert ($\alpha$-Fe$_2$O$_3$, which can be obtained by dehydration and which is non-magnetic material, into magnetite material and then oxidize the same into $\gamma$-Fe$_2$O$_3$. Since $\alpha$-Fe$_2$O$_3$ has a crystal form which is different from that of magnetite (Fe$_3$O$_4$), it must be reduced at high temperatures. Therefore, crystal is enlarged excessively. Thus, magnetic powder having a small crystallite size cannot easily be obtained. To obtain magnetic powder having small crystallite size, fine materials having an unsatisfactorily large specific surface area must be used.

However, the method of obtaining the iron oxide magnetic powder from $\gamma$-oxy iron hydroxide ($\gamma$-FeOOH) is able to easily obtain maghemite ($\gamma$-Fe$_2$O$_3$) having small crystallite size, large skeleton particles and a small specific surface area by dehydrating $\gamma$-oxy iron hydroxide ($\gamma$-FeOOH) at low temperatures because the $\gamma$-oxy iron hydroxide ($\gamma$-FeOOH) is an aggregate of needle-shape fine crystal.

Since maghemite ($\gamma$-Fe$_2$O$_3$) has a spinel crystalline form which is the same as that of the magnetite (Fe$_3$O$_4$), also reduction of the maghemite ($\gamma$-Fe$_2$O$_3$) at relatively low temperatures enables magnetite (Fe$_3$O$_4$) having small crystallite size to be obtained.

Therefore, the magnetic recording medium according to the present invention has the iron oxide magnetic powder obtained by the above-mentioned manufacturing method as the magnetic member thereof so that excellent surface characteristics and excellent electromagnetic conversion characteristics are obtained.

The Co coating method may be a known method having the steps of dispersing needle-shape maghemite or magnetite powder in water containing cobalt salt water solution or a mixed water solution of ferrous iron salt and cobalt salt; adding alkali hydroxide; raising the solution to 50° C. to 100° C.; and retaining the temperature so that cobalt denaturing is performed. Another known method may be employed which comprises the step of forming a spinel type ferrite layer containing cobalt.

The coating type magnetic recording medium has the magnetic layer formed by coating the surface of the non-magnetic support member with the magnetic coating and by drying the magnetic coating. The binder which is mixed with the magnetic coating according to the present invention, a dispersant, an abrasive material, an antistatic agent, a rust-preventive agent and a solvent for use to adjust the magnetic coating, each of which is used when required may be known materials.

The binder may be a known binder, such as polyurethane resin, vinyl chloride resin, nitrocellulose, polyester resin, epoxy resin, phenoxy resin, acrylic resin, acetal resin, butyral resin or their derivative. As a polar group, a sulfonic group, sulfate group, a carboxylic group and their salt, a tertiary amine group, a quaternary ammonium salt group, a phosphate group, or a phosphate group may be employed. In particular, alkali metal salt, such as the sulfonic group or a phosphate group is an effective material.

The abrasive material may be chrome oxide, $\alpha$-alumina, titanium oxide or SiC.

The magnetic recording medium according to the present invention may be a medium having structure in which the maghemite layer composed of the magnetic coating is formed on the non-magnetic support member, a structure in which a material is formed on one of the surfaces of the non-magnetic support member and a backcoating layer is formed on another surface or a structure in which a protective film made of carbon or the like and a top coating layer made of a lubricant is formed on a material. The structure of the magnetic recording medium is not limited particularly.

The non-magnetic support member may be made of any one of usual materials which are employed to form a magnetic recording medium of the foregoing type. The non-magnetic support member may be made of, for example, polyethylene terephthalate, polyethylene naphthalate, polyamide, paper or the like.

EXAMPLES

The magnetic recording medium according to the present invention will now be described. Note that the raw materials and manufacturing methods are not limited to the following descriptions and any one of conventional methods may be employed.

Example 1

Preparation of Iron Oxide Magnetic Powder

γ-FeOOH, which was the raw material, was prepared by a known oxidation method such that air was, under presence of iron powder, in a weak acid atmosphere and at about 70° C., blown into water solution of ferrous chloride, in which ferrous chloride was dissolved. The prepared γ-FeOOH was, in the air, heated and dehydrated at 260° C. so as to be formed into γ-$Fe_2O_3$, and then a Co coating process is performed. Thus, Co-γ-$Fe_2O_3$ was prepared.

Manufacturing Magnetic Tape

Co-γ-$Fe_2O_3$ magnetic powder was used to prepare the magnetic coating having the following composition 1 for forming the magnetic layer. The prepared magnetic coating was mixed and dispersed for five hours by using a kneader and a sand mill, and then four parts by weight of polyisocyanate were added. Then, the mixed material was filtered, and then applied to the surface of polyethylene terephthalate having a thickness of 14 μm so as to have a thickness of 4 μm. Then, the obtained material was subjected to a magnetic field orientation process, a drying process, a calander process and a hardening process, and then the material was cut to have a width of ½ inch so that a magnetic tape was manufactured.

| Composition 1 | |
|---|---|
| iron oxide magnetic powder | 100 parts by weight |
| polyester polyurethane resin | 12 parts by weight |
| vinyl chloride copolymer | 6 parts by weight |
| α-$Al_2O_3$ powder (abrasive material) | 10 parts by weight |
| carbon black | 5 parts by weight |
| stearic acid | 1 part by weight |
| butyl stearate | 1 part by weight |
| methylethylketone-toluene-methylisobutylketone (mixed solvent having a capacity ratio of 2:2:1) | 200 parts by weight |

Example 2

γ-$Fe_2O_3$ obtained in Example 1 was reduced at 280° C. while causing hydrogen gas to flow so that $Fe_3O_4$ was obtained. Then, $Fe_3O_4$ was coated with Co so that Co—$Fe_3O_4$ magnetic powder was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Example 3

γ-FeOOH was heated and dehydrated at 280° C. in the air so that γ-$Fe_2O_3$ was obtained. Then, γ-$Fe_2O_3$ was reduced at 280° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Example 4

γ-FeOOH was heated and dehydrated at 280° C. in the air so that γ-$Fe_2O_3$ was obtained. Then, γ-$Fe_2O_3$ was reduced at 300° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Example 5

γ-FeOOH was heated and dehydrated at 300° C. in the air so that γ-$Fe_2O_3$ was obtained. Then, γ-$Fe_2O_3$ was reduced at 300° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Example 6

γ-FeOOH was heated and dehydrated at 300° C. in the air so that γ-$Fe_2O_3$ was obtained. Then, γ-$Fe_2O_3$ was reduced at 330° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Example 7

γ-FeOOH was heated and dehydrated at 330° C. in the air so that γ-$Fe_2O_3$ was obtained. Then, γ-$Fe_2O_3$ was reduced at 330° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Example 8

$Fe_3O_4$ obtained in Example 2 was again oxidized so that γ-$Fe_2O_3$ was obtained. Similar processes to those according to Example 1 were performed except for the above-mentioned processes so that Co—γ-$Fe_2O_3$ magnetic powder was obtained. Then, magnetic coating having Composition 1 was prepared, and then a magnetic tape was manufactured.

Comparative Example 1

γ-FeOOH was heated and dehydrated at 300° C. in the air so that γ-$Fe_2O_3$ was obtained. Then, γ-$Fe_2O_3$ was reduced at 360° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Comparative Example 2

γ-FeOOH was heated and dehydrated at 420° C. in the air so that γ-$Fe_2O_3$ was obtained. Then, γ-$Fe_2O_3$ was reduced at 330° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Comparative Example 3

γ-FeOOH was heated and dehydrated at 550° C. in the air so that γ-$Fe_2O_3$ was obtained. Then, γ-$Fe_2O_3$ was formed into α-$Fe_2O_3$, and then reduced at 450° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Comparative Example 4

Similarly to Example 1, air was, under presence of a strong base, blown into ferrous salt water solution in which ferrous salt was dissolved so that the material was oxidized. Thus, α-FeOOH was obtained, and then α-FeOOH was heated and dehydrated at 600° C. in the air so that α-$Fe_2O_3$ was obtained. Then, α-$Fe_2O_3$ was reduced at 500° C. while causing hydrogen gas to flow so that $Fe_3O_4$ was obtained. A process for coating $Fe_3O_4$ with Co was performed so that Co—$Fe_3O_4$ magnetic powder was obtained. Similar processes to those according to Example 1 were performed except for the above-mentioned processes so that a magnetic tape was manufactured.

Comparative Example 5

Finer α-FeOOH was heated and dehydrated at 300° C. in the air so that α-$Fe_2O_3$ was obtained. Then, α-$Fe_2O_3$ was reduced at 400° C. while causing hydrogen gas to flow so that $Fe_3O_4$ was obtained. Similar processes to those according to Example 1 were performed except for the above-mentioned processes so that Co—$Fe_3O_4$ magnetic powder was obtained. Then, magnetic coating having Composition 1 was prepared, and then a magnetic tape was manufactured.

Comparative Example 6

$Fe_3O_4$ obtained in Comparative Example 4 was again oxidized so that γ-$Fe_2O_3$ was obtained. Similar processes to those according to Example 1 were performed except for the above-mentioned processes so that Co-γ$Fe_2O_3$ magnetic powder was obtained. Then, magnetic coating having Composition 1 was prepared, and then a magnetic tape was manufactured.

The size of crystallite and specific surface area of each of the iron oxide magnetic powder samples respectively obtained in Examples 1 to 8 and Comparative Examples 1 to 6 were measured. Results are shown in Table 1.

Note that the size of crystallite was obtained by performing X-ray diffraction (using Co—Kα1 ray) from the half value width of a peak of a plane having a plane index (311) in accordance with a Sherrer's equation. The specific surface area was obtained by performing adsorption of $N_2$ gas and employed a BET method.

TABLE 1

| Examples | Reaction Raw Material → Dehydration → Reduction → Oxide | Raw Material Oxy Iron Hydroxide Type of Crystal | Specific Surface Area [$m^2$/g] | Temperature at which Dehydration was Performed [° C.] | Temperature at which Reduction was Performed [° C.] | Size of Crystallite [nm] | Specific Surface Area [$m^2$/g] |
|---|---|---|---|---|---|---|---|
| Example 1 | γ→γ→- | γ-FeOOH | 62 | 260 | — | 17.0 | 28.0 |
| Example 2 | γ→γ→Mag | γ-FeOOH | 62 | 260 | 280 | 18.4 | 26.1 |
| Example 3 | γ→γ→Mag | γ-FeOOH | 73 | 280 | 280 | 19.8 | 28.7 |
| Example 4 | γ→γ→Mag | γ-FeOOH | 73 | 280 | 300 | 22.8 | 27.1 |
| Example 5 | γ→γ→Mag | γ-FeOOH | 73 | 300 | 300 | 24.3 | 28.1 |
| Example 6 | γ→γ→Mag | γ-FeOOH | 69 | 300 | 330 | 26.1 | 27.4 |
| Example 7 | γ→γ→Mag | γ-FeOOH | 73 | 330 | 330 | 28.0 | 28.8 |
| Example 8 | γ→γ→Mag→γ | γ-FeOOH | 62 | 260 | 280 | 19.0 | 26.0 |
| Comparative Example 1 | γ→γ→Mag | γ-FeOOH | 69 | 300 | 360 | 35.0 | 27.7 |
| Comparative Example 2 | γ→γ→Mag | γ-FeOOH | 69 | 420 | 330 | 41.7 | 27.0 |
| Comparative Example 3 | γ→α→Mag | γ-FeOOH | 80 | 550 | 450 | 45.0 | 32.0 |
| Comparative Example 4 | α→α→Mag | α-FeOOH | 75 | 600 | 500 | 51.1 | 30.1 |
| Comparative Example 5 | α→α→Mag | α-FeOOH | 85 | 300 | 400 | 39.0 | 34.0 |
| Comparative Example 6 | α→α→Mag→γ | α-FeOOH | 75 | 600 | 500 | 52.0 | 30.0 |

Then, the obtained magnetic coatings and magnetic tapes were evaluated. The evaluations were performed as follows.

TABLE 2

| Examples | Viscosity of Coating [mPa·s] | Surface Roughness SRa [nm] | Electromagnetic Conversion Characteristic | | Still Operation Resistance [Minute] |
|---|---|---|---|---|---|
| | | | RF-OUT [dB] | Y-C/N [dB] | |
| Example 1 | 3,800 | 11.8 | −0.5 | 0.3 | 120 minutes or longer |
| Example 2 | 2,600 | 11.1 | 0.4 | 0.7 | 120 minutes or longer |
| Example 3 | 3,800 | 12.1 | 0.0 | 0.5 | 120 minutes or longer |
| Example 4 | 2,900 | 11.3 | 0.1 | 1.2 | 120 minutes or longer |
| Example 5 | 3,900 | 11.9 | 0.0 | 0.5 | 120 minutes or longer |
| Example 6 | 3,200 | 11.6 | 0.2 | 0.4 | 120 minutes or longer |
| Example 7 | 3,900 | 12.2 | 0.0 | 0.2 | 120 minutes or longer |
| Example 8 | 2,500 | 11.0 | −0.2 | 0.5 | 120 minutes or longer |
| Comparative Example 1 | 3,500 | 11.9 | −0.5 | −0.5 | 120 minutes or longer |
| Comparative Example 2 | 3,100 | 11.5 | −0.8 | −1.2 | 120 minutes or longer |
| Comparative Example 3 | 5,600 | 13.6 | −1.0 | −1.5 | 120 minutes or longer |
| Comparative Example 4 | 4,900 | 12.8 | −1.1 | −1.3 | 120 minutes or longer |
| Comparative Example 5 | 6,500 | 13.0 | −0.8 | −0.5 | 90 minutes |
| Comparative Example 6 | 4,600 | 12.5 | −1.7 | −1.5 | 120 minutes or longer |

(1) Viscosity of Coating

The viscosity of each magnetic coating in which the iron oxide magnetic powder was dispersed and which was not applied was measured by using an E-type viscosity meter.

(2) Surface Roughness

A tracer type 3D surface roughness measuring machines was used to obtain mean roughness SRa of a reference surface.

(3) Electromagnetic Conversion Characteristics

A magnetic tape having a width of ½ inch was loaded into a cassette. A measuring machine obtained by modifying a commercial VHS video deck to enable an output of a video signal to be obtained was used to record RF signals each having a frequency of 4 MHz. Then, output RF-out of a reproduction signal and ratio Y-C/N with noise measured at a point apart by 1 MHz were measured.

(4) Still Operation Resistance

A magnetic tape having a width of ½ inch was loaded into a cassette. A measuring machined obtained by modifying a commercial VHS video deck such that the still (a still image) mode cannot be suspended after a lapse of a predetermined time was used to record RF signals each having a frequency of 4 MHz. Then, the same track was continuously reproduced in the still mode under an acceleration atmosphere of 5° C. so as to examine the resistance in accordance with the time in which attenuation by 3 dB from the initial output. Note that the continuous reproduction in the still mode was interrupted after a lapse of 120 minutes.

As can be understood from Table 1, the iron oxide magnetic powder according to Examples 1 to 8 has a small crystallite size of 30 nm or less though the specific surface area is 30 m²/g or less and skeleton particles are large.

On the other hand, Comparative Examples 1 and 2 arranged to perform reduction and dehydration at high temperatures and having similar specific surface areas to those of the samples according to the examples resulted in the crystallite being enlarged excessively.

Comparative Example 3 in which $Fe_3O_4$ was obtained from γ-FeOOH through α-$Fe_2O_3$ and Comparative Example 4 in which $Fe_3O_4$ was obtained from α-FeOOH through α-$Fe_2O_3$ resulted in large crystallite size being realized unsatisfactorily because high temperatures were required to reduce α-$Fe_2O_3$ (form the same into $Fe_3O_4$) though the raw material finer than that according to the examples was used.

Comparative Example 5 arranged such that finer α-FeOOH was used and dehydration was performed at low temperatures resulted in crystallite having relatively small size being obtained. However, also the skeleton particles had small size and thus the specific surface area was enlarged unsatisfactorily.

Also Comparative Example 6 having the arrangement such that $Fe_3O_4$ was obtained through α-$Fe_2O_3$ resulted in similar crystallite size to that Comparative Example 4 being realized.

As can be understood from Table 2, each of the magnetic coatings according to Examples 1 to 8 had low viscosity because the specific surface area of the iron oxide magnetic powder was small. Thus, the magnetic tape using the foregoing magnetic coating had a magnetic layer having excellent surface characteristics. Note that the viscosity of the magnetic coating is raised in proportion to the specific surface area of the iron oxide magnetic powder, as shown in FIG. 1.

Since each of the magnetic tapes according to Examples 1 to 8 had a small crystallite size, excellent electromagnetic conversion characteristics were obtained in high regions. In particular, excellent Y-C/N was realized as well as satisfactory durability.

Each of the magnetic tapes according to Comparative Examples 1 to 6 arranged to perform dehydration and reduction at high temperatures resulted in large crystallite size and unsatisfactory electromagnetic conversion characteristics. Comparative Example 5 arranged to use α-FeOOH type iron oxide magnetic powder finer than that according to the examples had a large specific surface area. Therefore, the viscosity of the magnetic coating cannot be lowered, and thus satisfactory surface characteristics cannot be obtained. Moreover, the size of the skeleton particles was reduced and therefore satisfactory durability could not be obtained.

As a result, the iron oxide magnetic powder obtained by dehydrating γ-FeOOH at the relatively low temperatures of 250° C. to 350° C. and by reducing the obtained γ-$Fe_2O_3$ at 260° C. to 350° C. has the crystallite size of 30 nm or less and the specific surface area of 30 $m^2$/g or less. If the iron oxide magnetic powder is employed as the magnetic member, the viscosity of the magnetic coating can be lowered and the dispersion of the magnetic member can easily be performed. Therefore, a magnetic recording medium having excellent surface characteristics and satisfactory electromagnetic conversion characteristics can be obtained.

As can be understood from the above-mentioned description, the present invention having the arrangement such that γ-ox iron hydroxide (γ-FeOOH) is dehydrated and reduced at relatively low temperatures enables iron oxide magnetic powder having small crystallite, large skeleton particles and thus a small specific surface area to be obtained. The iron oxide magnetic powder is not coagulated and thus uniformly dispersed during the kneading process for kneading the iron oxide magnetic powder into a medium such as a binder. Moreover, since the viscosity of the magnetic coating can be lowered, excellent coating characteristics preferred for the coating process for coating the non-magnetic support member with the magnetic coating can be obtained.

Therefore, the magnetic recording medium using the iron oxide magnetic powder as the magnetic member thereof has excellent surface characteristics because the iron oxide magnetic powder can easily be dispersed in the magnetic coating, the viscosity of the magnetic coating can be lowered and thus excellent coating characteristics can be obtained. Moreover, the magnetic recording medium containing the iron oxide magnetic powder having the small crystallite size enables excellent electromagnetic conversion characteristics in the high regions to be realized.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:

a magnetic layer containing iron oxide magnetic powder including crystallite having size ranging from 17 to 28 nm when measured by X-ray diffraction using Co—Kα1 ray from a half value width of a peak of a plane having a plane index of 311 and in accordance with a Sherrer's equation, and a specific surface area ranging from 26 to 28.8 $m^2$/g when measured by a BET method and a binder, wherein said magnetic layer is formed on a non-magnetic support member.

2. A magnetic recording medium according to claim 1, wherein said iron oxide magnetic powder is maghemite (γ-$Fe_2O_3$) coated with Co.

3. A magnetic recording medium according to claim 1, wherein said iron oxide magnetic powder is magnetite ($Fe_3O_4$) coated with Co.

* * * * *